(12) United States Patent
Cooper

(10) Patent No.: US 8,134,644 B2
(45) Date of Patent: Mar. 13, 2012

(54) AUDIO SYNCHRONIZER CONTROL AND COMMUNICATIONS METHOD AND APPARATUS

(76) Inventor: J. Carl Cooper, Incline Village, NV (US)

(*) Notice: Subject to any disclaimer, the term of this patent is extended or adjusted under 35 U.S.C. 154(b) by 1523 days.

(21) Appl. No.: 11/538,740

(22) Filed: Oct. 4, 2006

(65) Prior Publication Data
US 2007/0085575 A1  Apr. 19, 2007

Related U.S. Application Data

(60) Provisional application No. 60/727,041, filed on Oct. 15, 2005.

(51) Int. Cl.
*H04N 9/475* (2006.01)

(52) U.S. Cl. .......................... 348/515; 348/512

(58) Field of Classification Search .......... 348/512–520, 348/192
See application file for complete search history.

(56) References Cited

U.S. PATENT DOCUMENTS

| | | | |
|---|---|---|---|
| 5,387,943 A * | 2/1995 | Silver ........................... | 348/512 |
| 5,530,483 A | 6/1996 | Cooper et al. | |
| 5,809,454 A * | 9/1998 | Okada et al. ................... | 704/214 |
| 6,216,085 B1 * | 4/2001 | Emmerink et al. ........... | 701/117 |
| 6,665,751 B1 * | 12/2003 | Chen et al. ..................... | 710/52 |
| 6,906,755 B2 | 6/2005 | Lundblad et al. | |
| 2002/0087973 A1 * | 7/2002 | Hamilton et al. ............... | 725/32 |

OTHER PUBLICATIONS

BKSTS Dictionary of Image Technology, 3rd ed. 1994, pp. 76, 77, 140 & 141.

* cited by examiner

*Primary Examiner* — Michael Lee

(57) ABSTRACT

In television type systems having separate data, audio and video portions, it is desirable to maintain or correct the relative timing of the signals by delaying the lesser delayed one(s) to match the delay of the more delayed one(s). A method and apparatus are described where events leading to significant changes in delay of a first, more delayed signal are recognized before that delay change appears in that first delayed signal, for one example by recognizing delay changes made before or at the input to, or within the system. Information about the significant delay change is communicated to a second signal's compensating delay before hand to enable faster and more accurate tracking of the second signal's delay to the first signal's delay. Additionally the second signal's compensating delay may convey information about potential delay artifacts which would be created by delay changes to the first signal's delaying device in order to affect when and/or where significant delay changes are made in the first signal, thereby minimizing such artifacts. Control of where, how and when significant delay changes are made in order to minimize artifacts is also shown.

100 Claims, 3 Drawing Sheets

AUDIO SYNCHRONIZER CONTROL AND COMMUNICATIONS METHOD AND APPARATUS

The application receives priority from Provisional Application 60/727,041 filed Oct. 15, 2005 which is incorporated herein in its entirety.

FIELD OF THE INVENTION

The invention pertains to systems where related or unrelated signals are processed or delayed separately, and in particular to television type systems where audio and video portions in various forms are processed separately, and it is desirable to maintain or correct the relative timing of such signals. As used herein, processing is defined as operations on or with one or more of the signals which cause relative delays therebetween. Processing includes for example, but is not limited to, digital signal processing, transmission and temporary or long term storage. In particular, processing devices often respond to particular events by imparting significant delay changes to the signal being processed. For example video signal processing devices often impart significant jumps in the amount of delay imparted to the video signal. These significant delay changes are difficult for the tracking delay to accommodate.

PRIOR ART AND BACKGROUND OF THE INVENTION

Prior art devices are utilized to delay the lesser delayed signal(s) to match the delay of the more delayed signals. Heretofore, these prior art delay devices have received a Digital Delay Output (DDO) or digital delay signal from the device or system which creates the greater delay, and in response to the DDO operates to adjust a delay mechanism to add an additional delay to the lesser delayed signal(s). For example in television systems a video delay device such as a video synchronizer outputs a DDO which is coupled to a companion audio delay device to cause the audio delay to track the video delay, this operation maintaining the lip sync of the audio with the video. It is generally accepted that the video delay is much more significant than any audio delay and thus audio delays are for the most part ignored. That is in prior art systems the delay imparted to the audio signal from audio signal processing is generally considered insignificant in comparison to the delay imparted to the video signal from video signal processing. While this solution of providing a video DDO to an audio delay which causes the audio delay to match the video delay (with some limitations and errors as described below) has worked well, it nevertheless fails to address a number of heretofore unrecognized problems which are addressed by the present invention.

Prior art problems, and the instant inventive concepts related to solutions for those problems will be taught herein by way of example with respect to television systems having audio and video portions, and in some examples data portions. It will be understood by the person of ordinary skill that the inventive concepts described in the teachings herein are generally applicable to maintaining or correcting the relative timing of related or unrelated signals of many types. As used herein audio and video apply to various forms which audio and video may be processed, carried and/or stored in such as optical, electronic, analog and digital in compressed or uncompressed form.

Of particular trouble is the speed with which the delay of the longer delayed signal can change, and the ability of the tracking delay to adjust to cause a corresponding change of delay in the lesser delayed signal(s), especially when the longer delayed signal experiences a significant change of delay. Significant as used herein with respect to delay change will be understood by the person of ordinary skill in the art as a change of delay which takes place in amount, rate of change or time or combinations thereof, and which depart from the immediately preceding steady state delay conditions. For example significant delay changes include, but are not limited to, changes of the amount of delay either instantly or faster than would be expected from the immediately preceding rate of delay change, changes in the rate of change of delay, the above often being exhibited by the dropping or repeating of one or more block of signal, such as fields or frames of a video signal or GOP of a compressed video signal.

For certainty, as used herein applicant, as his own lexicographer, defines significant when used in association with delay, rate and the like means one (or more) change (larger or smaller) which takes place within a block of signal information which change has a size which exceeds 1% of that block or a rate of change which exceeds 1% of the immediately preceding rate of change, expressed as A per B (i.e. A/B) where A and B are blocks of signal information (not necessarily the same blocks). As one example a significant delay change occurs within a 1 frame block of a television video signal when the delay changes by an amount that is greater than 1% of a frame of television video. A dropped or repeated line, field or frame is another example of such a significant delay change. As yet another example, a delay change which occurs within 1 line, field, frame, GOP, second or minute that is greater than 1% of that 1 line, field, frame, GOP, second or minute is significant.

As still another example one of ordinary skill in the art will understand delay rate changes may be significant delay changes as used herein, and may be expressed for example as a first block rate per second block rate. Such delay rate changes include, but are not limited to, samples per frame, samples per second, seconds per minute, frames per second and frequency changes. A memory writing or reading frequency change (or combination change of the two) of more than 1% is an example of a significant change. As another example, a delay which is getting longer (changing) at a rate of 1 frame per minute changes to getting longer at a rate of 1.3 frames per minute would be a significant delay change.

One of ordinary skill will know the particular blocks of signal information relevant to a significant change to pertain to the nature of the system which causes the delay changes, with the inventive concepts herein being applicable to many different systems and their particular blocks of signals. Note that the block may be expressed as time, memory locations, memory addresses, signal parameters or other such measures as will be known to one of ordinary skill from the teachings herein. For example delays are often expressed in units of time (e.g. seconds and milliseconds) or contiguous groups of samples of data (e.g. lines, fields, frames, bitmaps, GOPs, I frames, B frames, P frames) which one of ordinary skill would know are applicable blocks.

Note here that a steady state condition may be one in which the delay is constant, or is constantly changing at a steady rate. As an example the delay may be slowly and continuously increasing or decreasing (analogous to the rotation of the hands on a motor driven mechanical clock), or may be slowly and incrementally increasing or decreasing (analogous to the stepping of the time display on a digital clock). The delay may take on a significant change instantly (analogous to setting the time on a digital clock) or the rate of change may itself change instantly (analogous to the movement of the hands when setting the time on a mechanical clock). As a further example, consider the motion of the hands on a motor driven mechanical clock when the time is manually changed. When one twists the knob, the hands take a sudden change in rotational velocity which is considered significant as the term is used herein. When the knob is released the hands return to their slow and steady rotation which is considered steady as the term is used herein.

Existing television systems for example can experience significant changes such as instant or very fast changes in the delay of the video signal when one or more fields or frames of video, or group of compressed frames of compressed video (GOPs) are skipped over or repeated in signal processing devices such as video synchronizers. Additionally the rate of change of delay can experience instant or very fast changes such as when the incoming video signal or a synchronizer reference signal changes frequency or is switched to a different video signal having a different frequency.

Additionally video signals which are stored (in any of the various forms which are or will become known to those in the art) are often recalled at an irregular rate. For example a PVR may recall a television program at a speed which is controlled by a viewer who may start, stop, reverse and change speed as the viewer desires. Such changes cause variations in video delay, both in respect of the delay as it relates to the storage of the program but also as it relates of the delay of the video signal which is passed through processing circuitry (for example decompression circuitry) after the signal is read from the storage device. Such variations in delay make it difficult for a tracking audio delay to maintain lip sync of the audio and video portions of the television program.

In another example a video signal is available to a particular point in a system via differing paths having differing delays. For example a video signal from one city may be transmitted to another city via a high quality compression system and channel, with a backup being provided by a lower quality but cheaper compression system and channel. Generally the higher quality compression system will involve more delay to the video signal than the lower quality system because of the extensive signal processing which takes place such as ½ pixel motion prediction, adjustable block sizes and many other improvements to quality video compression which have come about in recent years (and will continue to come about in the future). The two versions of the video signal are available at the particular point, and if for some reason a switch is made from one to the other (such as for example when one falls) an instant delay in the video will often take place, the magnitude of which may be relatively small or may be relatively large. It would not be unexpected to have instant delays in the magnitude of seconds occur in such situations as the quality of video signal processing, such as for example compression, increases in the future.

In still another example, the same scene is captured and conveyed by different sources having different delays, for example a newscaster being televised by two cameras. The same image (the newscaster) may be selected to be passed to additional signal processing (which may itself have an image dependent delay) with the newscaster image experiencing different delays for each camera. Again the delay might be significant and the change in delay can be instant as the selection of one camera or the other is made. Additionally this selection may cause the downstream processing delay to change as the video content is changed.

Note here that in respect to the present invention the inventor defines an image and a scene somewhat differently that those words are commonly utilized in the art. A scene will be understood in this specification and claims to be an electronic representation of a particular thing or set of things. For example a scene of a newscaster captured by a camera, or it may be an electronically created newscaster image. The scene of the newscaster may differ, for example because of the differing angles of two or more cameras capturing the scene, or because the newscaster moves from one frame to the next, or the scene may be precisely the same as for example relatively delayed and undelayed versions thereof. Image will be used in this specification and claims to convey a particular electronic representation which is to be displayed, for example the image from one camera or an electronically generated image. As used herein, unless explicitly defined otherwise via wording or context, image is used to mean a particular image which may be composed of one or more fields or frames, and may be in relatively delayed or undelayed form.

It will be recognized generally that as the quantity of signal processing has, and continues to increase, and the complexity of signal processing systems increases, the amount of instant or fast delay changes a particular signal may experience has also increased. This causes serious problems for prior art tracking delay devices which are expected, but unable, to quickly track these delay changes in order to maintain the relative timing between one or more delayed signal(s) and one or more lesser delayed signal(s).

Consider what happens in a television station which switches from a video signal carrying a scene with a 1 second delay and the scene with a 6 second delay. An instant 5 second delay change is experienced. The accompanying audio delay must be instantly changed by 5 seconds, but the audio delay can not simply be changed by that amount without creating serious artifacts (when speaking of audio herein the inventor intends to reference all types of audio which will be known in the art, for example mono, stereo, 5.1 channel, etc. in optical, electronic, analog, digital and compressed digital form). For example consider a delay where digital audio is written into a circular buffer with one address and read from the buffer with another address. Delay changes are made by instantly changing the read address. If the delay must be shortened, a loss of 5 seconds of audio will be experienced. If the delay is lengthened a silence of 5 seconds in the audio will be experienced. This loss of audio or insertion of silence is clearly unacceptable.

Prior art solutions to overcome the loss of audio or insertion of silence include devices such as described in U.S. Pat. No. 4,313,135 where audio is passed through a shift register with a variable clock is used. The delay is shortened or lengthened by increasing or decreasing the clock frequency and thus the speed at which the audio is clocked through the shift register. This solution causes pitch errors to be created in the audio whenever the delay is changed. In order to minimize the listener's annoyance from the pitch errors, the rate of change of the frequency of the clock must be limited to less than 1%, since most people do not readily detect a 1% pitch error.

Another prior art solution is taught in U.S. Pat. No. 5,920, 842. In this invention a circular buffer with a write and two independent read addresses are used and changed to change the delay along with cross fading from a first delayed audio stream to another delayed audio stream, the two streams having slightly different delays. This invention thus can change delays while at the same time compensating for the pitch artifacts which would otherwise be created. Unfortunately the invention of the '842 patent will in some instances still create a noticeable tempo change in the audio.

Another problem with the prior art is that the delay control signal from the video delay is a measure of the current delay of the videos, that is it is a measure of the delay of the video which is being output from the processing which causes the delay. By the time the tracking delay receives the new delay value, that delay has already happened and the compensating delay can not change instantly without creating problems such as those given by example above.

OBJECTS OF THE INVENTION

A first object of the invention is to provide a method and apparatus to enable more accurate tracking of significant changes of delay by one or more compensating delay.

Another object of the invention is to provide a method and apparatus to more quickly track significant changes of delay by one or more delay.

Still another object of the invention is to provide a method and apparatus to predict a significant change of delay before a compensating delay outputs the portion of the signal corresponding to the change of delay.

And still another object of the invention is to provide a method and apparatus to predict a significant change of delay before the delay outputs the portion of the signal corresponding to the changed delay.

Yet another object of the invention is to provide a method an apparatus for communicating delay information to a compensating delay in advance of the need for the compensating delay to change its delay.

Yet still another object of the invention is to provide a method and apparatus for communicating a plurality of types of delay information to a compensating delay.

A further object of the invention is to provide a method and apparatus to communicate to a compensating delay a new delay value and an expected time the new delay value is to take place.

A still further object of the invention is to provide a method and apparatus to communicate to a compensating delay a new delay value and an expected time the start of the change from the existing delay value to the new delay value is to take place.

A yet still further object of the invention is to provide a method and apparatus to communicate to a compensating delay a new delay value and an expected time duration over which the change from the existing delay value to the new delay value is to take place.

An additional object of the invention is to provide a method and apparatus to communicate to a compensating delay a new delay value and an expected rate of change from the existing delay value to the new delay value is to take place.

Another additional object of the invention is to provide a method and apparatus to communicate to a compensating delay a direction of change of a new delay value.

Still another additional object of the invention is to provide a method and apparatus to communicate to a compensating delay a direction of, and rate of change of a new delay value.

And another object of the invention is to recognize the presence of events in a signal processing system which will lead to significant delay changes.

And yet another object of the invention is to determine the amount and timing of significant delay changes.

And still another object of the invention is to provide information of significant delay changes for a tracking delay in advance of such delay changes taking place.

And yet still another object of the invention is to control one or more delays in a manner that delay changes are made on the input or output side of, or within, a delay with respect to creating a minimum of delay change artifacts.

Further, an object of the invention is to control a video delay in a manner that delay changes are made on the input or output side of, or within, the delay with respect to creating a minimum of video delay change artifacts.

Further, another object of the invention is to control an audio delay in a manner that delay changes are made on the input or output side of, or within, the delay with respect to creating a minimum of audio delay change artifacts.

Other objects and a more complete understanding of the invention may be had by referring to the following description, drawings and claims.

DETAILED DESCRIPTION OF THE INVENTION

Figure 1:
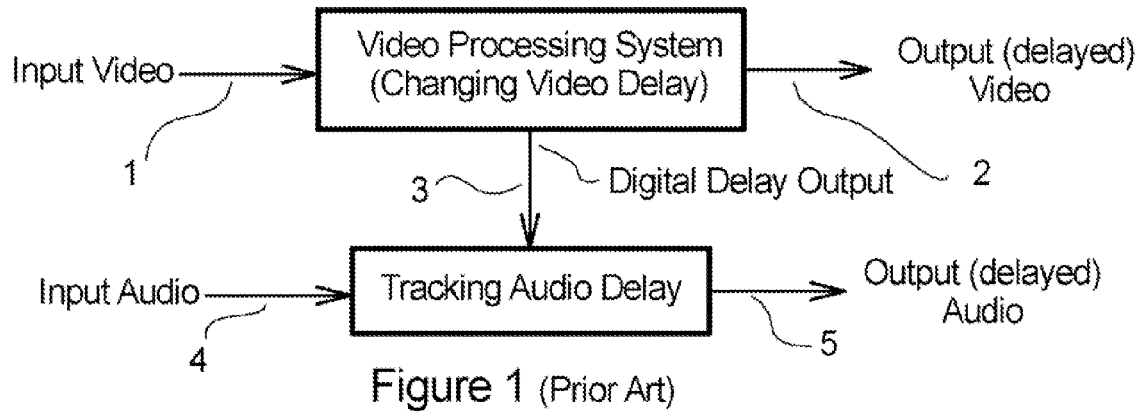
FIG. 1 is a block diagram of a prior art video processing system configured with a tracking audio delay.

In FIG. 1 a typical prior art video processing system is seen which is configured with a companion tracking audio delay. Input video 1 is coupled to the video processing system which may be for example a video frame synchronizer, digital video effects device, video encoder, video decoder, video recorder or other video processing device which imparts a delay to the video signal and outputs a version thereof, 2. Note that the output video 2 may be the same format or a different format as the input video 1. The video processing system also has a digital delay output 3 (DDO) which conveys data representing the current or immediately past delay of the video 2 which is being output. The digital delay output 3 is coupled to a companion tracking audio delay which receives an input audio signal 4, and in a steady state condition delays it by the amount of delay communicated by 3 and outputs delayed audio 5. In a steady state condition the output video 2 is properly synchronized with the delayed audio 5. Note that the video processing system in this example may instantly change the delay of output video 2 by dropping or repeating a frame of video. Dropping or repeating a frame of video may take place for example by jumping over a frame which is about to be output and instead outputting the next frame in memory (dropping) or jumping back and repeating the output of the immediately preceding frame which was output.

The term delay as used herein may refer to an absolute delay, for example the delay of the video signal from input to output, or may refer to a relative delay, for example the delay of an output video signal from the norm or average as in the delay of an output video signal of a prerecorded program with respect to its normal or expected timing. A delay may be imparted to a signal by signal processing circuitry which may include memory circuitry and/or transmission such as via one or more of ether, optical, electronic or storage device. As used herein, a memory or memory circuit denotes signal processing circuitry which specifically includes memory devices and a delay or delay circuitry denotes signal processing circuitry which provides a signal delay and may or may not include memory (but may incorporate transmission. Memory circuitry may be of any type presently or in the future known to those of ordinary skill in the art including optical, semiconductors electro-mechanical and electro-optical types.

Additionally while the invention is described by way of example with respect to television type systems in the presently normal operation where the video signal experiences more delay than the accompanying audio signal it will be understood that the inventive concepts described herein are not so limited and will be equally useful in systems where the audio signal is more delayed that the video signal, or either may be the more delayed signal from time to time, or more generally to other types of related or unrelated signals for which synchronization is desirable.

In the operation of the prior art system of FIG. 1 if the delay of the output video changes significantly, for example because one or more frame of video is dropped or repeated as described, the audio output 5 is no longer synchronized with output video 2. Because there was no advanced information about that delay change which was conveyed via 3 and because the audio delay cannot change instantly it will take a while to catch up to the new video delay. The new delay information will be communicated to the tracking audio delay, however it will take some time for the new delay value to be achieved, depending on how fast the tracking audio delay makes its delay changes. Those audio delay changes are a function of the quality of the audio delay changing circuits coupled with the level of artifacts which are considered acceptable. The present invention helps to overcome the problem of having to balance the level of audio artifacts and speed of audio delay change.

With current tracking audio delays on the market, a one or two frame delay change can be made over a 10 or 20 frame time period, respectively with an acceptable level of artifacts being generated. This corresponds to a 10% rate of delay change. Assuming a 2 frame delay change, the tracking audio delay will catch up with the video and provide proper synchronization in 20 frames, or in the NTSC system of 30 frames per second this would take ⅔ of a second. This is usually an acceptable situation.

In the foreseeable future, it is expected that the rate of delay change with acceptable levels of artifacts (currently tempo modification artifacts are most noticeable) will remain near 10%. If however the size of significant video delay changes increases to the ones or tens of seconds range as expected, this rate of tracking delay change as used with prior art DDO communications will lead to unacceptable performance. Consider for example a 1 second instant delay change which will cause the tracking audio delay to take 10 seconds to catch up with the video. Stated another way, a 1 second video delay change will cause lip sync errors to exist for 10 seconds until the tracking audio delay catches up with the new video delay. A 5 second video delay change will cause a lip sync error for almost a minute. In a television industry where a 20 second commercial can cost hundreds of thousands of dollars, such lip sync errors are not only annoying to the viewer, but unacceptable to the advertiser.

Figure 2:
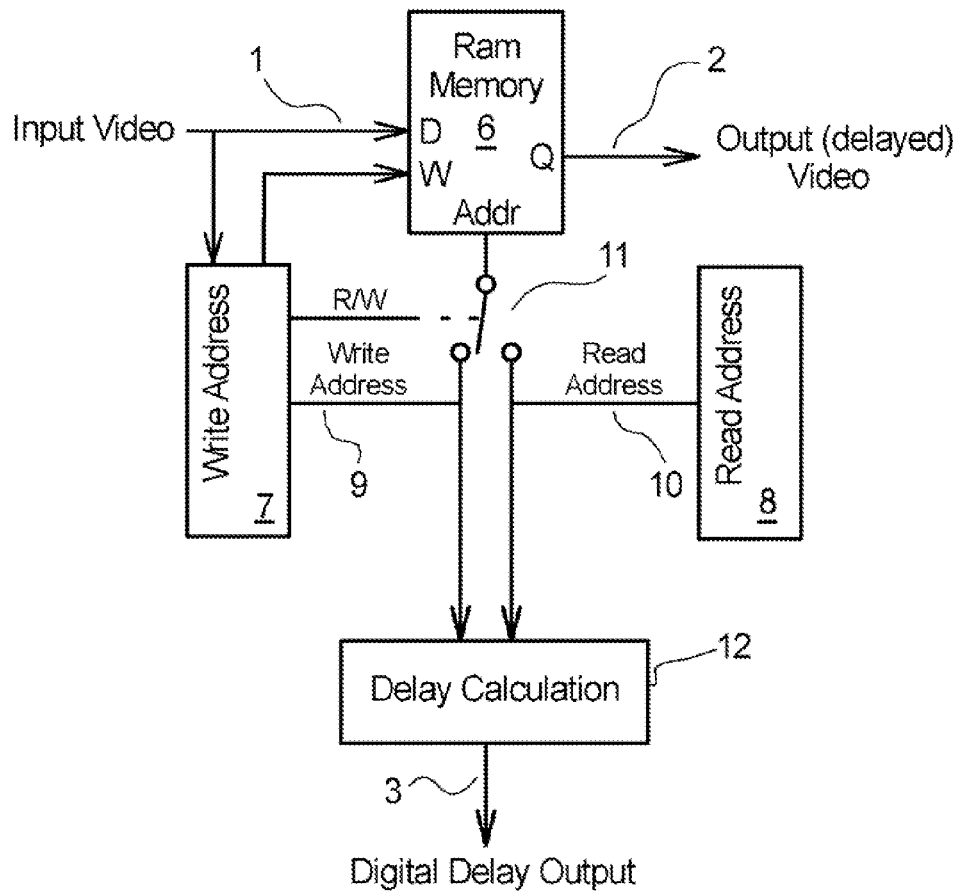
FIG. 2 is a block diagram of a prior art video delay portion of a video processing system.

FIG. 2 shows a typical prior art video delay circuit which is simplified for purposes of explanation by way of example. Such circuits are commonly referred to as video frame synchronizers, and are found as stand alone devices and are incorporated with other video signal processing devices and systems. For example many video encoders, video switchers and special effects products incorporate one or more video frame synchronizers on their video inputs. The explanation given with respect to FIG. 2 will be understood to be applicable with other types of signal processing equipment, using various forms of video in compressed or uncompressed form or both. For example the use of the invention with compression encoders and decoders and various types of video recorders, all of which may utilize differing types of video storage such as semiconductor, electro mechanical (computer hard disk for example), optical (computer optical disc for example), three dimensional (crystal lattice for example), or others which are or will become known to those of skill in the art. The associated control of writing and reading of signals described with respect to FIG. 2 as the write address element 7 and read address element 8, will of course be different to accommodate the differing storage types, and the writing and/or reading of multiple signals and versions thereof may be different however the inventive concepts taught herein will nevertheless remain applicable.

FIG. 2 shows an input video signal 1 coupled to a RAM memory 6 and write address element 7. The write address element 7 generates a write address 9 which is coupled via switch 11 to the RAM memory 6 when video is written into the memory. A read address element 8 generates a read address 10 which is coupled to the RAM memory 6 via switch 11 when video is read out of the memory. While actual video delay circuits are much more complicated, and vary significantly in detail and operation (including considerable variations in addressing), this abbreviated explanation will nevertheless serve to demonstrate the operation, and some shortcomings, of these prior art devices to those of ordinary skill in the art.

Consider digital video samples or elements being carried by the input video signal. When each arrives, the write address element 7 causes it to be written into the memory 6 at a particular address. For example the first sample of a video frame is written into address 1, followed by the second video sample being written into address 2 and so on.

The read address element 8 generates read addresses which are coupled to the memory 6 to determine which address, and thus which sample, is read to provide the output video signal 2. By controlling the time delay between when video is written to a particular address and when video is read from that same address, the delay of the output video 2 relative to the input video 1 can be controlled. This control of delay is precisely what is useful in a video synchronizer, allowing the input video signal to be precisely delayed in order that it may be synchronized with another video signal thus allowing the two to be intermixed. An example of such intermixing is a picture in picture display (PIP) where the video from one television channel is displayed in a window inside the video from another television channel.

This video delay can be measured by the delay calculation circuit 12 and the delay value sent to a companion tracking delay via DDO 3. One way of measuring the delay is to use a timer or counter which is started when a known write address appears and stopped when that same address appears as a read address. For example if the timer is started on write address 1 and stopped on read address 1, that elapsed time will correspond to the video delay.

For delays which operate continuously, as the great majority do, the delay can also be measured by the delay calculator by subtracting the write address from the read address and multiplying by the time it takes to step from one address to another. Note that because the number of addresses is limited (because the amount of memory is limited) the addressing will sooner or later reach the maximum and roll over to the first address. This roll over needs to be accounted for in the subtraction, but is commonly done in the art. There are also many other ways of determining delays, both from addressing and otherwise, which are in use.

While FIG. 2 shows the write and read address coupled directly to the delay calculation circuit 12, there are various other manners of coupling to the write and read address information know in the art as well as other types of storage and delays with corresponding storage and recall of video. Those of ordinary skill will understand the description of delay calculation is given by way of example and will be able to practice the invention with such other types of address coupling and types of storage from the teachings herein. As just one example, the address counter is often started at or set to a known place with the occurrence of a particular event in the video signal and 12 may respond instead to that event or the known place address.

One problem with these types of systems is that the video delay calculation measures the current input to output video delay, i.e. the delay corresponding to the output video relative to the input at any instant. This works fine as long as the delay is constant or slowly changing, but is troublesome when significant delay changes take place. Another problem is that the audio itself may be delayed or advanced (i.e. offset) with respect to the video at the input of the video delay. Some prior art tracking audio delays allow the user to manually input an offset amount which can compensate for a fixed audio offset with respect to undelayed video, however it is common for that audio offset to change over time, thus requiring the user to manually input a new offset amount in the tracking audio delay whenever the offset changes.

Two typical and common problems occur with prior art delay calculation circuits. First, it becomes necessary to delete or repeat one or more output frames of video. This is commonly done by manipulating the read address element to instantly jump to a new read address corresponding to the start of an earlier or later frame, causing a corresponding instant delay of the output video 2. When that jump is made, the instant difference between write and read addresses will be fairly quickly used by the delay calculator 12 and used to send the new delay value to the tracking audio delay via DDO 3. Unfortunately, as described above the tracking delay can't instantly make the change and will take some time to catch up to the new output video delay. Additionally, as described above there may be a changing audio offset which one of ordinary skill will understand from the present teachings is desirable to be accommodated.

Second, it is often necessary to delete one or more corrupted incoming frames of video, for example deleting a corrupted GOP. This commonly happens when the video signal is received from a source or via a transmission channel which can cause errors in the video. For example video which is received by satellite can be corrupted by heavy rain which causes a momentary loss of the video. In such instances the corrupted frames of video are deleted by causing the write address element 7 to jump back to overwrite those memory locations containing corrupted video with good video (or alternatively just stop writing when the first corrupted frame is detected). When that jump is made it causes an instant difference between the write and read addresses will be fairly quickly used by the delay calculator 12 and used to send the new delay value to the tracking audio delay via DDO 3. Note that until the previously stored video frames will continue to be read out of memory and thus its delay (relative to the output audio) will not change. It is not until the new video frame corresponding to the jump at the memory input is finally output from the memory 6, that the video delay (relative to the output audio) will take on that corresponding delay change. The companion audio synchronizer however receives and immediately starts acting upon the new delay information corresponding the new write address after the disruption because no information other than the newly calculated delay is sent. This is a problem the present invention may overcome.

Additionally, in some circumstances where the input is corrupted, the delay calculation 12 may never be able to calculate the proper amount of delay of the output video relative to the output audio, since it is limited by operations with addresses. The out of sync condition could continue indefinitely, with 12 sending what it thinks is the proper delay value (corresponding to the delay of the video through 6) but with the lip sync nevertheless being incorrect. The condition would continue until something causes the system to be reset, for example the loss of both audio and video and a corresponding delay calculation of zero delay or a correction by presentation time stamps (PTS).

For prior art video delays of a few frames these problems are usually not noticeable enough to the viewer to be serious. For large video delays which are expected in the future this will become a serious problem. Consider for example a video delay which is nominally 30 seconds long which takes a 1 second backward jump in output video. The DDO delay changes from 30 seconds to 29 seconds. Because the tracking audio delay will take 10 seconds or so to catch up, lip sync is out for 10 seconds.

Also, consider a 1 second corruption of input video which causes an input write address jump back by 1 second. Again the DDO delay changes from 30 seconds to 29 seconds. The tracking audio delay will take 10 seconds to make this change, but because it will take this newly delayed video 29 seconds to arrive at the video output, the lip sync will be in error for the 19 seconds after the audio delay completes its change.

These types of problems do commonly occur with prior art systems, but because the video delays which are currently commonly used are relatively short, the problem self corrects as soon as the tracking delay catches up or the newly delayed video passes to the video output. Clearly prior art lip sync correction systems can (and do) experience significant problems which will become quite noticeable to the viewer with larger video delays which are capable of delaying video for longer times and making larger delay jumps.

One solution provided by the present invention is to determine how much the output video delay will change and when that delay change will present itself on the output video. That information is conveyed the tracking delay such that the tracking delay can change by the corresponding amount at the corresponding time. Note that the corresponding amount and/or time may not be the identical amount and/or time as will be described further below.

Figure 3:
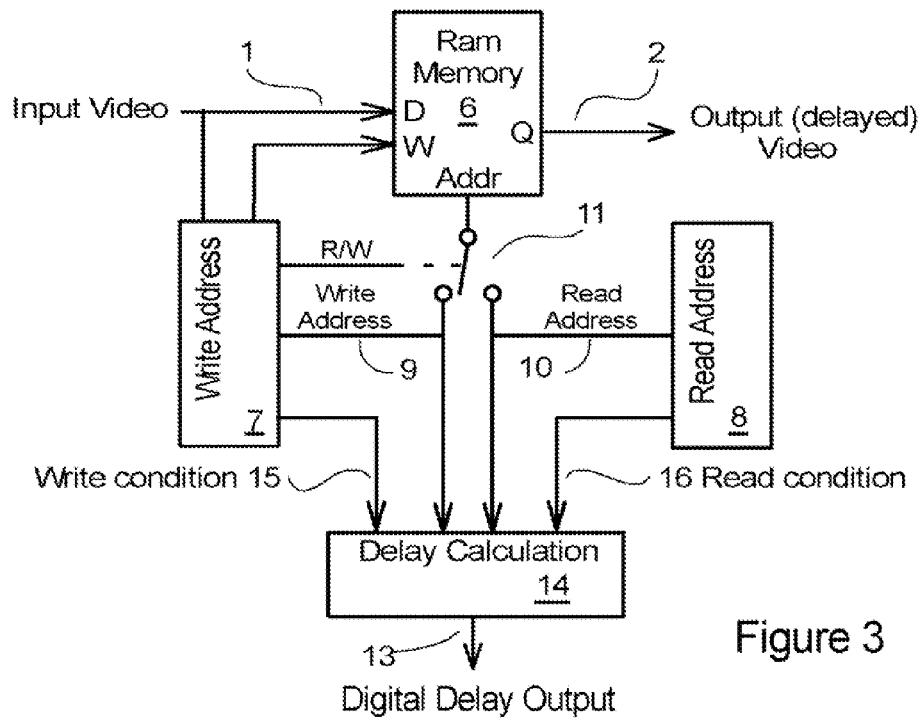
FIG. 3 is a block diagram of the preferred embodiment of the present invention.

FIG. 3 shows a block diagram of the preferred embodiment of the present invention 14 in operation with a prior art video delay system (i.e. one which does not respond to artifact information from the tracking delay). Elements 1, 2, 6-11 are the same as in FIG. 2, however the delay calculation element 14 is responsive to both of the read and write address elements 7 and 8 to provide additional delay information via improved DDO 13. The delay calculation 14 is preferred to receive additional write condition information 15 from the write element and additional read condition information 16 from the read element. In that the condition information is normally present in the address element, used to generate but is separate from the write and read addresses, it is preferred to obtain it directly. It will be understood however that it is possible to dispense with one or both of the read or write condition information communication 15 or 16 and obtain suitable condition information directly from, or in response to, the write and read addresses 9 and 10 or otherwise as will be understood from the teachings herein. Note that while it is preferred for 14 to respond to both the read and write side it is possible to utilize only one as desired in particular applications for cost savings or because of the nature of the delay of the video, as one example such as an inability of the write or read address to jump. As a further improvement in some systems it is desirable for 14 to receive an audio offset signal (not shown) and include that audio offset in the delay calculation 13 in order that video 2 and audio delayed in response to 13 are properly synchronized.

Write address element 7, memory element 6, read address element 8 and delay calculation element 12 may be of the type shown in U.S. Pat. No. 5,550,594 and from the teachings herein the person of ordinary skill will be able to adapt such for use in the present invention without resorting to undue experimentation or further invention. In particular the write address 9 and read address 10 are used by 12 to calculate the CURRENT DELAY parameter which is output via 3. Typically this parameter is carried as a pulse, or digital data and may be in units of seconds, fields, frames (in NTSC or PAL) or clock pulses or other units as are known to persons of ordinary skill in the art or as will be known from the teachings herein.

In the present invention information which is preferred to be provided via the DDO in addition to the CURRENT DELAY of the output video 2 includes the delay parameters DELAY CHANGE or the amount of the delay changes in time units such as milliseconds, CHANGE TIME conveying the amount of time over which the delay change takes place in units of seconds or milliseconds, DELAY DIRECTION corresponding to delay increase or decrease in binary 1 or 0 or a sign as described hereunder, and CHANCE START indicating when the delay change occurs or is to occur relative to a time known by the tracking delay in units of seconds or milliseconds. There may also be provided INPUT/OUTPUT change information of whether the delay change occurs at the input or the output of the memory (delay) in binary 1 or 0. The INPUT/OUTPUT information can aid the companion audio synchronizer in making fast delay changes by allowing it to operate on input audio or output audio (or both) to achieve maximum speed delay changes. Other information may be determined and conveyed as well, and other than the preferred units of measure may be used. For example the DDO may convey CURRENT DELAY, DELAY CHANGE as a signed number indicating increase or decrease, RATE OF CHANGE indicating the rate at which the DELAY CHANGE takes place in units of time of delay change per unit of time, such as milliseconds of delay change per milliseconds of time and CHANGE START. One of ordinary skill will recognize this information will provide significant delay change information. Only one, or a plurality of, or all of these different delay change parameters may be utilized to practice the invention with a given delay as will be apparent to the person of ordinary skill in the art from the teachings herein.

For example, if a delay change to the memory is caused by dropping or repeating a portion of the input video signal, the DDO will communicate the size of the change (DELAY CHANGE), that it is a decrease or increase (CHANGE DIRECTION), that it is instant (CHANGE TIME) and when the delay change is to appear at the output video signal (CHANCE START). Alternatively the DDO may communicate instead that the change takes place on the input signal (INPUT/OUTPUT) and when it takes place on the input. With this information provided by the DDO the tracking delay can start making its corresponding delay change at the optimal time. Of course for the tracking delay to make the optimum delay it must know how long it will take the input video to pass through the delay to the output, which is of course the new delay value that video will take on when it does appear at the output.

In the above example of a change in delay from 30 seconds to 29 seconds which occurs on the input video signal, and with a tracking delay which will take 10 seconds to complete the one second change (and assuming linear rate of change), an optimum change in tracking delay would start 24 seconds from the change in input video. In that fashion the change in audio delay will be centered about the instant output video delay changes with respect to when the video with the new 29 second delay appears at the output. In other words the tracking delay change over 10 seconds is centered about when the output video with the new delay appears.

Of course the tracking delay change may not be linear and may be responsive to the signal which is being delayed. As a simple example if the audio in the tracking delay is silent the tracking delay change could be very fast or even instant. It is preferred to take advantage of silence to make fast delay changes, even if the entire amount of desired delay change is not possible due to the length of the silence. That is, whatever amount of silence in the audio is desired to be used to fully or partially accommodate a desired delay change, and the position of the silence in the tracking memory may be utilized as well.

For example, if the desired delay change is to shorten the delay by 5 seconds and 1 second of audio silence has just been stored in the audio memory, the write address is preferred to be manipulated to remove (i.e. jump over) that silence thereby shortening the delay by 1 second. For example, if the desired delay change is to shorten the delay by 5 seconds and 1 second of audio silence is just being read from the audio memory, the read address is preferred to be manipulated to remove (i.e. jump over) that silence thereby shortening the delay by 1 second. The same is true for desired increases of the delay, by lengthing (rereading or rewriting) the silence at the output or input of the memory, respectively. One of ordinary skill in the art will recognize however that in some instances it will be desirable not to change delays during silence if that change will result in a temporary mismatch of audio sync (for example changing delay on the input of the audio memory whereas the corresponding change in video delay occurred at the output of the video memory and vice versa), or the change to the silence would cause an unnatural sounding audio, for example by removing silence between words or causing an unusually long silence.

As another example it may be desired to change the tracking delay quickly, at say a 10% rate of change, to get it close to the desired value and then change at a 1% rate of change to slowly achieve the desired value. Various other schemes will be known from the teachings herein and in particular as taught in more detail below.

Input video signal condition and delay information, including significant changes, is preferred to be communicated to 14 via 15 as the particular condition of the input video which leads to the delay change is detected by 7. For example, a corrupted video input signal is detected and that information used to cause the write address to jump to overwrite the corrupted video with good video (or to just stop writing so no bad video is stored). Alternatively, the delay calculator 14 can obtain the same information in response to the write address 9 since the address will jump (or stop incrementing), thus creating the delay change. One of ordinary skill in the art will understand from the teachings herein that other ways and methods of communicating input video signal condition and delay information will be useful and cost effective for particular applications and desired levels of performance.

Depending on the nature of significant delay changes and the length of the delay, it may be useful to communicate additional information, or to communicate delay information in parts. For example, as soon as a corruption is detected on the input, it will be known that a significant delay change will occur (assuming the video synchronizer is designed not to pass the corruption), that it will be a decrease in delay and when it will occur (as soon as the point of corruption passes through the current delay to the output) but not how long the delay change will be. The length of the delay change will not be known until the earlier of the current delay reaching zero (i.e. all of the good video is read from memory thus bringing the current delay to zero) or the corruption ends (i.e. the delay change corresponds to the length of the disruption). It is preferred to convey the presence of a significant delay change, its direction and change start to the tracking memory as soon as the corruption is detected and convey the amount of delay change as soon as the corruption ends or delay reaches zero. In that way the tracking delay can start to gradually change delay at a suitable time, even though it does not yet know how much the change will be. For example, if the current delay is 5 seconds, and the tracking delay receives significant delay change and decrease information, if it has not received the amount of change information within 2.5 seconds it will nevertheless know to start decreasing its delay since the length of the change will be at least 2.5 seconds. By waiting until the end of the corruption to transmit all of the information the tracking delay it may miss the opportunity to start its change until it is too late.

It will be understood that there are various manners and methods by which video signal processing devices handle faults like unlocked and corruption problems on input and output video. Some devices may simply pass the corruption whereas others may stop writing corrupted video into memory and other devices may switch to another source for the same or different video. It is desired that this device specific handling of faults be taken into account by the system, either by communicating the specific nature of the fault handling to the tracking delay when the fault occurs, or by communicating the type of video device or its fault handling operation to the tracking delay at some time before the fault thereby allowing the tracking delay to store or look up the nature of fault handling for that device in a locally or remotely stored database. Such device information can be communicated with the tracking delay on power on initialization, periodically or occasionally (by inquiry from the tracking delay initiated by the video device) or by operator command or entry where the operator is a human or an automation or control system.

Additionally, and especially in situations where a fault occurs, for example wherein the input or output video is corrupted or stopped, it is useful for the video device to convey sufficient information to the tracking delay in order that the audio signal may be altered in response to the expected or actual handling of that fault by the video device. The sufficient information may be conveyed before the fault, at the time of the start of the fault, during the fault, at the end of the fault or combinations thereof. As one example, the video device will stop writing corrupted video to memory when the corruption is detected and start writing again when the corruption ends. The video device may communicate this operation to the tracking delay ahead of time, and merely communicate the start and stop of corruption at the time they occur. Alternatively the video device may continuously communicate that it has stopped writing video for the duration of the corruption.

As another alternative the video device may either stop writing corrupted video to memory during corruption or may write the corrupted video to memory and then erase or overwrite the corrupted video stored in memory with good video after the corruption ends. These operations may be communicated to the tracking delay after the corruption has ended. One of ordinary skill in the art will know from the teachings herein of many useful mechanisms and methods for communicating information from the video device to the tracking delay, via one way or two way communications, which mechanisms and methods may be tailored to particular desired performance and cost parameters.

As just one example of how this fault information may be utilized, if the input or output video signal is lost it may be desirable to check the corresponding audio signal(s) to see if it has been lost in noise and mute the noisy portion, the muting of the noisy portion creates a silence which may be utilized as explained herein.

As still another example, if a portion of the output video is dropped or repeated, the DDO will communicate the amount, direction and timing of the change. It is preferred that such changes be conveyed to the tracking delay ahead of time, that is, expected delay changes taking place at the output are conveyed before they happen. Most normally output delay changes can be predicted from the nature of the signal processing which the output video experiences or from the control of the signal processing. For example if a viewer changes the speed of playback of a movie that change will be known as soon as the command is received and somewhat before the reading is changed. If a viewer instructs a video storage device to fast forward, jump over or delete unwanted stored sections of video (such as commercials) automatically, that information can be communicated to the tracking delay ahead to time. One of ordinary skill in the art will understand from the teachings herein that other ways and methods of communicating input, stored and output video signal condition and delay information will be useful and cost effective for particular applications and desired levels of performance.

In the frame synchronizer example one or more frames of video will be dropped when the video memory is about to fill and one or more frames of video will be repeated when the video memory is about to empty. In this manner the video memory is never allowed to completely empty or fill. In prior art synchronizers, frames are repeated on the read side and frames are dropped on the input side. Applicant however points out that frames may be repeated or dropped on the input (write side) or the output (read side) of the memory. In applicant's novel video synchronizer operation it is desired to make the change on the side of the memory which contains the least amount of motion in the video, since in that fashion the visibility of the change will be minimized. Thus, in applicant's invention if the memory is to be shortened a frame may be dropped by jumping the write address back to overwrite the previous frame or by jumping the read address to skip reading a frame, the choice of which depending on which operation creates the least visible artifact in the video. If the memory is to be lengthened, that generally is accomplished by repeating the reading of a frame, since it is generally difficult (but not impossible) to rewrite a frame of video which was just written, the choice of which creates the least visible artifact in the video. It will be understood that the selection of operation on write or read side is preferred to take into account the nature of the companion audio signal, with interaction between the video device and tracking audio delay to select based on the best combination of minimizing audio and video artifacts.

In respect to maintaining lip sync and keeping audio artifacts to a minimum, it is desirable to always make the change on the video and correspondingly audio input, or at least give priority to changes on the input, since this affords more advanced warning to the tracking delay than if the change is made on the output. It is preferred that priorities be established for making changes to input or output in accordance with the overall quality of the television program. For example a slight motion artifact in video is acceptable if accompanied with no lip sync or other artifact in audio, or a slight artifact in audio is acceptable if accompanied with no motion artifact in video, as compared to having both motion and audio artifacts. In this respect it is desirable for the tracking audio delay to keep track of the nature of artifacts which would be created on the audio as it is received, contained in and output from the memory. While these are the preferred priorities other priorities may be established, or changed, as desired to achieve a particular level of performance and cost. In particular, the priorities may be changed depending on the type of program as may be automatically detected or programmed by a human or machine operator.

This information about audio artifacts may be conveyed to the video processing device to enable it to select operations on input video or output video, in response to the nature of the audio artifacts which would be created in respect to each type of change. As a simple example, if it is known that there is 2 seconds of audio silence near the output of the audio memory, then changes in the output video would not create any appreciable audio artifact since any change made during silence would not be noticed. On the other hand, if the silence is located at or near the input of the audio memory, then changes to the input of the video memory would likely not create noticeable audio artifacts. It is noted that when audio information is to be conveyed to the video processing system it is preferred to utilize a bidirectional DDO. The bidirectional DDO will allow the video and tracking delay to communicate with each other thus facilitating operation.

The cause of the memory tending to empty or fill is that the reading rate is slightly slower or faster than the writing rate, as is the case when the write address element 7 is synchronized to input video 1 and the read address element 8 is synchronized to some other reference video. If reading is faster than writing the memory tends to empty and if reading is slower than writing the memory tends to fill. Both input video and reference video are normally derived from stable crystal sources, so the frequency difference is stable and the rate at which the memory empties or fills is measurable and predictable. In such instances the read address element 8 will determine ahead of time when it will be necessary to delete or repeat a portion of video, how much will be deleted or repeated (thus the size and direction of delay change) and when that change will be made. This information is conveyed to the delay calculation element 14 via read condition 16. Alternatively that information may be obtained in response to the write address 9 and read address 10 since one address will catch up to the other at a predictable rate. With knowledge of the operation of the read address element operation it will be possible to predict from the addresses and the rate at which one catches up with the other when the output delay change will occur.

Of course more than one video and one tracking delay may be utilized and communicate among themselves as desired. For example in multiple channel broadcasting systems which utilize audio and video compression with statistical multiplexing, it is desired to have significant changes in video (or audio) programs not occur at or near the same time in more than one channel. In this fashion the overall bit rate for the group of channels is kept low, as compared to where changes take place in a plurality of channels at or near the same time. In such systems it is desirable to provide communication between video (and/or audio) devices to minimize such changes. Such changes can for example occur when dropping a video frame or decreasing the amount of audio silence.

In the preferred embodiment of the invention for use with video signal processing that does not respond to the tracking delay, the delay calculation element 14 receives write and read address information 9 and 10 which is utilized to calculate the delay information for the output video 2 under normal conditions as in the prior art. In addition it is preferred to receive write condition 15 and read condition 16 information from the write address element and read address element. The delay calculation then provides the current output video delay information under at least a steady state condition, and predicts or determines direction, how much, when and how (amount of time it takes to change) information about delay changes to be made to the output video in response to the write condition 15 and read condition 16, or alternatively in response to the write address 9 and read address 10. Note that the amount of time it takes for a delay to change may be expressed as time or some other value, for example a number of video data blocks, frames, clock cycles, seconds or minutes.

The direction, how much, when and how information is preferred to be conveyed to the tracking audio delay via the improved DDO 13. The direction information is preferred to be either increase or decrease delay, the how much to be the amount of the delay change, the when to be the time from the transmission of the when information via the DDO to when that change is expected to occur (or start if not instant) in the output video, and the how information is preferred to be the amount of time it takes for the delay change to occur (0 if instant).

One of skill in the art will recognize from these teachings that some of this preferred information is redundant, or may be implied or derived from other information. For example direction may be conveyed by positive and negative delay amounts. An instant delay change is conveyed by a how of 0. Accordingly it will be understood from the teachings herein that the improved DDO information may take on various forms and formats as desired to achieve a particular accuracy, speed of communications and cost of implementation. In addition it will be understood that various of the preferred information may be omitted is it is not needed (for example if there is no capability to overwrite bad input video), or additional information may be included. DDO information may be conveyed, communicated to transmitted to the tracking audio delay with any method which is or will become known to the person of ordinary skill to be suitable for the type and amount of data desired to be utilized.

Figure 4:
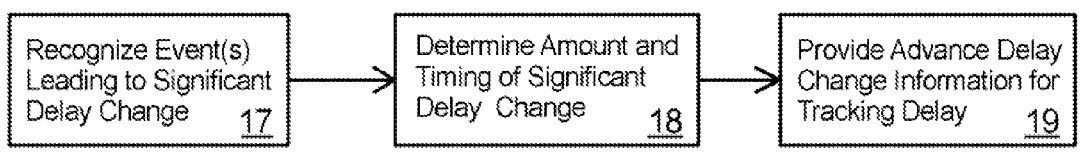
FIG. 4 is a flow chart describing operation of the preferred embodiment of the present invention.

FIG. 4 shows a flow chart describing the preferred embodiment of the invention as used to convey signal processing information to a tracking delay. Element 17 recognizes an event or events which lead to significant delay change. Element 18 is responsive to element 17 to determine the amount and timing of significant delay change. Element 19 is responsive to element 18 to provide significant delay change information for the tracking delay to use. It will be understood that it is desired to provide the delay change information in advance of need by the tracking delay to start tracking the significant delay change, although circumstances may prevent such advance. In instances where advanced information is not provided, simultaneous or after the fact information is preferred, in that order. Simultaneous or after the fact information will be useful in many situations as the signal for which such events correspond may be delayed further by downstream devices or processing thus allowing that information to be effectively utilized. Of course, as described above in some systems it is desirable to take any audio offset into account in providing the delay change information for the tracking delay, especially if the audio offset itself contributes to, or is responsible for, the significant delay change or the resulting relative audio to video delay.

As one example where simultaneous or after the fact information is useful, consider a television system where changes to a video signal delay occur due to changing video signal sources, changing video signal processing and or changing video signal hardware. The video signal is then input to a television which contains further video signal processing (and delay) as well as a tracking audio delay. By conveying simultaneous or after the fact information about the video signal currently being input to the television, the television may still provide tracking audio delay, taking into account the additional video delay in the television video processing, thereby ensuring proper lip sync is presented to the television viewer. In such a system the significant delay change information, while being simultaneous or after the fact with respect to video out of the processing which feeds the TV, can nevertheless be considered to be in advance of the video which is displayed to the viewer on the TV and consequently represents events which will lead to significant delay changes on the viewed video. Significant audio delay changes may be accommodated, either with or without a corresponding significant video delay change.

One of ordinary skill in the art will recognize that having any of the above described information about an audio or video delay change available, either before, during or after that change occurs, can be useful in many instances where a method or apparatus operates to achieve delay tracking. According to the teachings herein, any, part or all of such information may be utilized by the person of ordinary skill to facilitate improved delay tracking as compared to the prior art.

Figure 5:
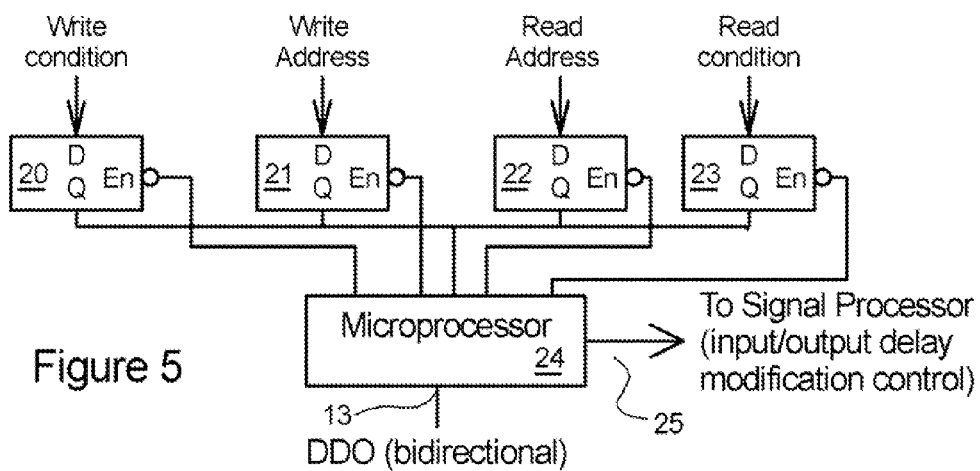
FIG. 5 is a block diagram of the delay calculation circuit of the preferred embodiment of the present invention.

FIG. 5 shows a block diagram of the preferred embodiment circuitry for the delay calculation element 14 as used with tracking delays which provide information back to the signal processing system to aid in control of significant delay changes. As compared to 14, when used with television systems, FIG. 5 shows the additional capability to respond to companion audio delay artifact information. Each of the current write condition, write address, read address and read condition are latched into latches 20-23 respectively. The microprocessor circuit 24, operating under suitable program code as will be known to one of ordinary skill in the art from the teachings herein, reads each of the registers 20-23 via a common data bus by enabling the respective register's output as is well known in the art. One of ordinary skill in the art will know that microprocessor circuit 24 may be of any digital type of microprocessor and support circuitry having sufficient speed, memory capability and program execution capability to perform the calculations and communications necessary as will be known from the teachings herein and will be further known to take on numerous different digital structures which are well known in the art. While the preferred embodiment of FIG. 5 is preferred to utilize a microprocessor running a program to perform the desired tasks as outlined herein, it will be recognized that other circuits, methods and structures may be utilized to practice the invention as described and claimed as will be known to the person of ordinary skill from the teachings herein. In particular, one or more embedded reduced instruction set computer (RISC) core may be utilized in application specific ICs, which core(s), instructions and programming may be optimized for a particular level of performance and cost.

The current output CURRENT DELAY parameter is computed by taking the difference of the read and write address and multiplying the difference by the address change rate as is known in the art. The input DELAY CHANGE parameter is determined in response to the write condition thereby giving the amount of delay change which corresponds to the number of bad frames of input video which are overwritten or repeated frames of input video. DELAY DIRECTION is conveyed with DELAY CHANGE which is a positive number for an increased delay and a negative number for a decreased delay. With respect to input delay changes, the CHANGE START parameter of the new delay is the current delay at the time of the first bad frame of video to be overwritten or repeated frame. In the preferred embodiment the CHANGE TIME is instant, so that parameter is 0.

In the preferred embodiment, for output delay changes which must be made, the amount of advance is chosen to be at least ½ of the delay change time of the companion audio synchronizer for the maximum delay change which can be experienced. This amount of advance corresponds to the start time of the delay change. The delay change parameter is a positive number for repeated video and a negative number for dropped video and the amount corresponds to the amount of dropped or repeated video. In the preferred embodiment the delay change is instant, so the how parameter is 0. The microprocessor 24, operates to determine in advance when the delay change is needed, how much is needed and how long the delay change will take. That delay change information is communicated from the microprocessor 24 to the tracking delay via DDO 13. At a predetermined time, microprocessor 24 causes the video delay change to take place in the video processor circuit via 25. The tracking delay will have received the delay change information in advance and will cause its delay change to be made in correspondence with the video delay change.

In the preferred embodiment, memory status is monitored to detect when memory is about to fill or empty. When the full condition approaches, the video processor will skip over some video, such as one or more video frames, in the input or the output. Skipping output video is done by jumping ahead in memory reading. Skipping input video is made by stopping writing, or jumping the writing address back. The decision to make the change on the input or output is made by microprocessor 24 by inspecting input and output video to determine the amount of motion in each, and receiving input and output audio artifact information from the companion audio delay via the DDO, which information indicates the magnitude of artifacts which will be created by changing input or output audio to compensate for a significant change in video delay.

If for example there is very little motion on input video, and there would be few artifacts created by altering input audio (either at the input of audio memory or when it is later output from audio memory), the input video is skipped over. On the other hand, if there is a lot of motion on input video and very little motion on output video, and few artifacts would be created by altering output audio, then output video is skipped. In situations where there is motion or no motion on both input and output video the change is made according to where minimal audio artifacts will be created. If few or many audio artifacts will be created on both input and output audio, video is altered on input or output according to where the fewest motion artifacts are created.

Alternatively or in addition to response to audio artifacts, the video processing device may choose an optimum time to make significant audio and/or video delay changes. For example if a full or empty memory condition is approaching, the video processing device may wait until a period of audio silence or other period of audio which will have minimal artifacts if delay changes are made during that period. The video delay would then be made during this optimal time. By starting the inspection of audio and video for optimal segments during which to make needed delay changes, i.e. video segments with little motion and audio segments with silence or little complexity, the probability of finding coincidental or closely matching audio and video segments will be fairly high, as television programming is often filled with brief periods of video inactivity which are accompanied by silence or audio of little complexity.

The capability of waiting for optimal matching audio and video segments for significant delay change finds particular use with buffer memory systems which are continuously used where optimum video storage takes up some known portion of the maximum available memory. For example if the optimum storage is between 1/8 and 7/8 of the maximum storage, whenever storage approaches one of the optimal limits and matching audio and video segments occur, significant delay changes can be made without generating an appreciable number of artifacts. Video synchronization equipment obtains significant benefit from such methods. Of course such optimal matching may be practiced not only with devices having fixed amount of memory available but also with devices having variable amounts of storage memory available.

In determining video motion artifacts, it is preferred to utilize compression type motion vectors for the video signal, obtaining a statistically representative value of those motion vectors for the candidate video segment (such as a frame to be deleted or repeated and one or more frames before and after) and determine and send a statistically representative value of the motion vectors to 24 via the read and write condition signals which are read via 20 and 23. The magnitude of the statistically representative value is desired to represent the amount and magnitude of motion present in the video segment which is being considered to be dropped or jumped over.

Similarly a prediction of audio artifacts for input and output candidate audio segments may be utilized. Such prediction may take into account any current or desired audio offset if desired. In the instance of this example, the segments are those over which delay change takes place, as compared to video where the candidate video segments are those which are repeated or deleted. The audio artifacts for the candidate segments are computed based on the audio delay change operation and a statistically representative value of the audio artifacts is provided via the DDO to 24. For example in current audio synchronizers pitch correction artifacts are adequately compensated but tempo artifacts are not. Tempo artifacts are most noticeable for music which contains repetitive low frequency components such as drum beats and bass instrument notes. Speech and sporting event sounds generally have fewer noticeable tempo artifacts. A statistically representative measure of the amount and audibility of such tempo components is desired to be sent to 24. Such a statistically representative measure is preferred to be determined by taking a histogram of bands of low frequency components of the audio signal over the candidate audio segments. It is believed tempo components for most audio signal will tend to create large peaks at particular frequencies.

The CURRENT DELAY, DELAY CHANGE, CHANGE DIRECTION, CHANGE TIME CHANGE START and if desired INPUT/OUTPUT parameters for the video processing device, as well as the audio artifact information from the tracking audio delay, are preferred to be serially transmitted as the DDO via RS-422 or other suitable communications method known to those of ordinary skill from the teachings herein. Of course one of ordinary skill in the art will recognize from the teachings herein that in some systems it will be desirable that audio offset may be automatically taken into account as well.

A companion audio synchronizer may be implemented using any prior art method of delaying audio, with the exception that it is preferred to include audio artifact circuitry as previously discussed. For delay changes made at the video output the control of the audio delay is modified to allow the audio synchronizer to start the change of delay approximately 1/2 of the amount of time it will take to accomplish the audio delay, before the output video with the new delay is expected. For example assume the new video delay is shortened by 1 second, the audio synchronizer will take 10 seconds to make the 1 second change and the video with the new delay will be output in 20 seconds. The audio synchronizer will operate to center its delay change over the arrival at the output of the video with the new delay, thus the audio synchronizer will start making the delay change in 15 seconds and continue for 10 seconds. This operation will allow the audio delay to start 5 seconds before and end 5 seconds after the video with the new delay appears at the output.

Figure 6:
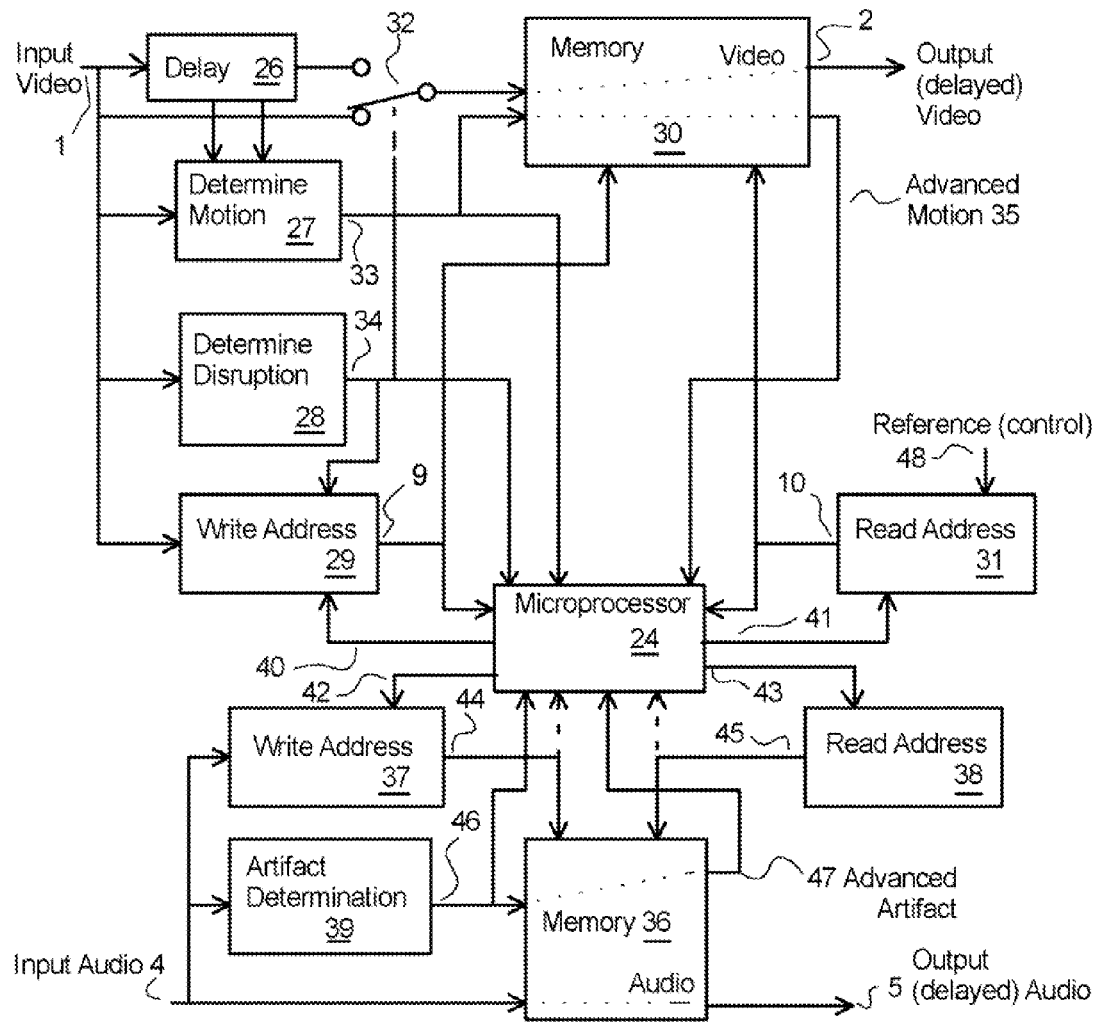
FIG. 6 shows a block diagram of the invention of the preferred embodiment as operated with an integrated audio and video signal processing system.

FIG. 6 shows a block diagram of the preferred embodiment of the invention as utilized in an integrated audio and video signal processing system. Input video 1 is coupled to a delay element 26, a motion determining element 27, a disruption element 28, a write address element 29 and a selector 32. The delay element 26 serves to delay the input video and provide delayed output versions for use by the selector element 32 and motion determining element 27. For example, delay element 26 is preferred to provide two frames of video for 27 to utilize in determining frame to frame motion, and also provide a delayed video for selector element 32. The delayed video for selector element 32 is utilized because when receiving and writing frames of video to memory 30, it is possible that a portion of the frame may be corrupted. It will thus be possible to replace the corrupted portion with a corresponding portion from the previous frame, which previous portion will be available at the delayed output. It will be known to one of ordinary skill in the art that delay 26 may be combined with memory 30.

The motion determining element 27 operates to determine the amount of motion of a particular segment of incoming video and provide an output motion parameter 33 which is representative of the amount of motion for that segment. It is preferred that motion be determined frame by frame (for uncorrupted portions of the frame) where the amount of motion of a particular frame relative to the immediately preceding, and if desired (with suitable adjustment of 26), following frames. The motion parameter is coupled to the microprocessor element 24, and is delayed in the video memory 30 and output from the delayed memory a known time before the video corresponding thereto is output. The advanced motion parameter 35 (so called because it is advanced with respect to the delayed video which it corresponds to) is also coupled to the microprocessor element 24. In this fashion the microprocessor element will have available the motion parameter for the video about to be input to the memory and the video about to be output from the memory. With this information the microprocessor element will be able to determine whether altering input or output video by dropping or repeating a segment thereof will create the lower visibility motion artifact. In addition the microprocessor element will be able to determine whether altering input or output video will create an unacceptable motion artifact and thus will be able to delay such alteration until another time. Such motion information may be stored in memory 30 or another memory by the microprocessor 24, or carried through memory 30 with the video frames, for use on stored or output frames of video.

As an example, if a portion of an incoming frame of video is corrupted the microprocessor element will be able to replace it with video from the preceding or following frame based on which of those frames has the least amount of motion around the corrupted portion (and thus the clean portion having the best likelihood of matching the corrupted portion). Additionally the microprocessor element will be able to use the motion information to determine whether frames from the input, storage or output of the memory have the least motion and thus are the preferred ones to be dropped or repeated in order to change memory length.

The motion determination is preferred to be computed as is well known in respect to MPEG compression, with a total of all of the magnitudes of the motion vectors (i.e. without regard to direction) for all of the uncorrupted blocks of a frame being summed to provide the motion parameter 33. If the incoming video is already in compressed form the motion vectors which are carried as part of the compressed video stream may simply be recovered and their magnitude summed, averaged or otherwise used to compute a value representative of the amount of motion in the frame. It will be understood that while a separate motion determination element 27 is shown as providing the motion parameter 33 in response to input side video and video from delay element 26, the computation related to the motion parameter 33 may very well be performed by microprocessor element 24 in response to the video signal 1 and/or in response to other circuitry.

Input video 1 is coupled to a video disruption determination element 28 which operates to determine the degree to which input video has been disrupted, if any, and output a disruption parameter 34. The output of 28 is coupled to the microprocessor element 24 and to write address element 29 and selector 32. If input video 1 has suffered a significant disruption write address element 29 is caused to pause, preventing writing of disrupted video, or alternatively selector 32 may be operated to cause previously input video without the disruption to be coupled to memory for storage. It is preferred that short disruptions be handled by merely operating selector 32 to fill in the disruption with previous, clean video and longer disruptions be handled by pausing writing.

Disruption determination will be specific to the type of input video which is being utilized. For analog or serial digital video inputs such detection may be performed in conjunction with sync recovery or in conjunction with the PLL clock generation or recovery as is well known in the art. With compressed video inputs disruption determination is preferred to be performed by the compression related circuitry which is itself capable of determining if there are problems with the compressed video stream, as is known to the person of ordinary skill in the art. Accordingly, it will be understood that the disruption determination element is shown as being directly responsive to input video by way of illustration of example and may very well be responsive to the write address element 29 or some other signal processing element not shown which will be utilized for the particular format of input video signal.

Write Address element 29 operates in the usual manner in response to input video as described above to provide write address 9. In addition 29 is responsive to microprocessor element 24 via 40 to cause the write address to jump ahead or jump back in order that video in memory can be overwritten or skipped. Note that FIG. 6 (and FIGS. 2, 3 and 5) shows the use of addressing inherent with common semiconductor random access memories. Other types of memories are known in the art and are commonly utilized with video signals, for example such as semiconductor FIFO, magnetic and optical disks. It will be understood that the use of memory element 30 and associated write address element 29 and read address element 31 in FIG. 6 (and corresponding elements of FIGS. 2, 3 and 5) is by way of example to illustrate the present inventive concepts. One of ordinary skill in the art will understand from the present teachings that the inventive concepts may be utilized with any type of video memory or storage which storage may not incorporate read and write addressing, or may utilize different types of addressing. One of ordinary skill in the art will know to practice the invention with such other types of memory or storage, without resorting to undue experimentation or additional invention, from the teachings herein.

Write address element 29, memory element 30, read address element 31 and disruption element 28 may be of the type shown in U.S. Pat. No. 5,550,594. Delay 26 and motion determining element 27 may be of the type commonly utilized to generate motion vectors for MPEG video encoders and the person of ordinary skill will be able to adapt such for use in the present invention, without resorting to undue experimentation or further invention, from the teachings herein.

Selector element 32 operates as described above to select delayed or undelayed input video and couple the selected video to the input of the video memory element 30. If desired selector element 32 may incorporate additional inputs and/or outputs to facilitate the selection of video having varying amounts of delay. For example it may be desirable to have two or more previous frames of video available for selection to be input to memory 30, in order that the frames which are most closely matched to the one being replaces may be utilized.

Video memory element 30 operates to delay input video in the manner described above in response to write address 9 and read address 10. In addition memory element 30 operates to delay the motion parameter 33 and provide a delayed motion parameter 35 which is advanced with respect to the corresponding output video 2. The delayed motion parameter 35 is coupled to microprocessor element 24. Video memory which operates as a delay in response to write and read addresses and to additionally delay a data signal is taught in U.S. Pat. No. 5,550,594 and may be utilized for the elements 29-31.

Read address element 31 operates as described above to provide a read address 10 for memory 30. Read address element 31 is responsive to a reference or control 48 to generate read addresses 10 which provide delayed video in synchronization with the reference or in response to control. Such control may be used to implement a PVR function for example where the output video is caused to speed up, slow down, stop, jump forward or jump backward. Read address element 31 is also responsive to microprocessor element 24 to provide read addresses which cause the output video to skip forward or backward, for example to drop or repeat sections of video.

The companion input audio signal 4 is coupled to an audio write address element 37, an artifact determination element 39 and audio memory 36. Audio is delayed in memory 36 and output as delayed audio 5. It is preferred that an audio artifact correction circuit (not shown) be incorporated in the output audio path to correct for artifacts such as pitch errors which occur when the output audio speed is changed to effect delay changes. Such an audio memory and artifact correction circuit is shown in U.S. Pat. No. 5,920,842. Because the audio artifact correction circuit is preferred to operate with the audio memory read and write addresses it is preferred that a separate DSP and microprocessor circuitry be utilized to control audio delay in normal delay operation as taught in U.S.

Pat. No. 5,920,842. In that fashion microprocessor element 24 merely controls delay adjustments as described above.

Write address element 37 operates to provide write address 44 to audio memory element 36 in order that audio samples are stored in the memory as is known in the art. In addition, if desired, write address 44 may be coupled to microprocessor element 24 in order that it may be utilized by the microprocessor element for such capabilities as determining the current audio delay imparted by memory 36. Write address element 37 is responsive to microprocessor element 24 via 42 in order that the speed of generation of write addresses may be altered, thereby altering the delay of output audio 5. Additionally 37 may be caused to jump forward or backward in order to achieve quick delay changes, a function particularly useful for periods of silence in the audio. For example, it will be possible for microprocessor element to make changes to memory delay by changing the write address, a feature which is particularly useful when periods of silence are present on the input audio. Additionally the write address may be caused to jump forward or backward thus allowing input audio to be overwritten or repeated in memory.

Read address element 38 operates to provide read addresses to memory element 36 in order to achieve proper delay of output audio 5. Read address element 38 operates in response to microprocessor element 24 in order that the speed of generation of read addresses may be altered, thereby altering the delay of output audio 5. Additionally 38 may be caused to jump forward or backward in order to achieve quick delay changes, a function particularly useful for periods of silence in the audio. Read address 45 may be coupled to microprocessor element 24 if desired, in order that it may be utilized by the microprocessor element for such capabilities as determining the current audio delay imparted by memory 36.

Although it is preferred that the normal operation audio delay and artifact correction be controlled by a separate microprocessor circuit and DSP, if desired either or both of those functions may be instead controlled by microprocessor element 24 thus eliminating or reducing the need for those components.

Input audio is coupled to artifact determination element 39 in order that segments of the audio may be analyzed for the potential of generating artifacts in the event of a delay change. The artifact determination element 39 outputs a statistically representative measure 46 of the artifact potential for each audio segment which is coupled to the audio memory 36 and microprocessor element 24. Memory 36 delays the artifact measure 46 and outputs it in advance of the segment of audio which it is associated with as an advanced artifact value 47. The advanced artifact value 47 is coupled to the microprocessor element 24.

Microprocessor element 24 is preferred to operate to control when delay changes are made to output audio 5 in order to track as closely as possible significant delay changes in the video at 2 as described above. In additions, microprocessor element 24 may operate to control when and where significant delay changes are introduced in the video signal in response to the potential of generating audio artifacts, also as described above. Alternatively, as described above, microprocessor element 24 may also operate both to control the delay of output audio 5 to match output video 2 and also to reduce artifacts such as pitch errors in the output audio 5, for example by controlling the reading and writing of audio and video.

It will be understood however that there is no requirement to correct the timing of audio at 5 to match video at 2 and audio at 5 may very well be delayed with respect to video at 2 to allow for further delay in video at 2 or conversely audio at 5 may be advanced with respect to video at 2 to allow for further audio delay, or audio at 5 may be timed to allow for combinations of additional audio and video delays. Alternatively, the audio delay circuitry may be dispensed with and included as part of another device, for example a television display which will have its own additional video processing circuitry (with additional video delay) and a companion tracking audio delay with responds to DDO information as described above.

It will be understood by those of ordinary skill in the art that the term signal having a delay is meant to encompass a signal, for one example a video signal, which experiences some sort of change which causes a delay or causes an additional or lesser delay in the signal as a direct or incidental result of that change. Note that the signal may change, for example if the source video is changed at the input of the signal processing. Consequently as used herein reference to a signal which will experience a significant delay change generally implies the signal at the output of, or resulting from that change unless it is otherwise apparent from the context. Of course that signal may be further delayed and there is no requirement in practicing the invention that the correction of the companion signal be performed with respect to the output of the processing causing the significant delay. For example, a significant delay may occur in video at the output of switch 32 of FIG. 6, but there is no requirement to correct the companion audio signal in the system to match video at that point.

In a video frame synchronizer or other video processing device the input video signal may change, or the signal processing may change or both input video signal and the signal processing may change and the resulting video signal which has experienced the change will be considered to be a signal having a delay as that phrase is used herein and in the claims. The person of ordinary skill will recognize from the teachings herein that the invention may be practiced with a variety of combinations of changing signal(s) and/or signal processing which results in a significant delay change in a signal at a given point (after that change) in a system and that signal at the given point will be understood to be a signal having a delay.

Other examples with respect to FIG. 6 which may lead to a significant delay change to the signal output from memory 30 include, but are not limited to, input video at 1 changing to a different video source, switch 32 changing position thus changing the signal processing, the memory 30 may change delay by drop or repeat of one or more frame.

One of ordinary skill in the art will know that the phrase "event which will lead to a significant delay change in said first signal" and similar phrases refers to a change leading to a significant delay change of the signal at the output of processing giving rise to the change or a later point in the signal path. Such processing may include changes in signal transmission, signal storage, signal source, processing hardware, processing firmware or software, type of processing or the amount of processing. One of ordinary skill in the art will know that the phrase "significant delay change" means the delay of the signal at the output of that processing with respect to that output signal (which may change from one signal to another) which was previously input to that processing. Of course as the output signal changes the particular corresponding input signal or point from which that output signal was derived may differ.

One of ordinary skill in the art will understand that an indication of a significant delay change may occur immediately with the delay change if the signal is inspected at the point in the system where the delay occurs, for example at switch 32 of FIG. 6, or that same indication may occur well before the delay change occurs if the signal is inspected at a point further along the signal flow in the system, for example at the output of memory 30 or at a point even further along the signal flow such as in equipment connected to 2.

While the invention has been shown and described herein in its preferred embodiment, it will be understood these teachings are not restricted to the practice of the invention as shown in respect to the preferred embodiment. It will be appreciated that numerous variations to the above described invention will become apparent to those skilled in the art from the principles and spirit of the invention provided herein and in particular the invention may be practiced with the various elements and steps rearranged and modified to fit a desired level of performance, complexity and cost. In particular, elements 20-24, 26-31 and 36-39 may be implemented in many types of digital logic circuitry, microprocessor circuitry, state machines, LSI, VLSI, ROM, PROM, PLD, FPGA, ASIC, IP Core, RISC or other well known methods, structures and embodiments or combinations thereof with the interconnection and cooperation therebetween being tailored to match the particular implementation used. Such choices and designs are within the capability of one of ordinary skill in the art from the teachings herein. Additionally it will be understood that the invention may be combined with and/or share steps or elements with other methods or devices as may be desired and steps of methods described herein may be practiced with various apparatus and various apparatus described herein may be practiced with steps of methods. Of particular interest is the combination of the inventive concepts and sharing of circuitry and methods with television receivers, displays and recorders to ensure proper lip sync is maintained during the presentation of television programming to viewers. The above described methods, systems and apparatus are intended to be exemplary of the invention and should not be taken in a limiting sense. The following claims should be referred to for determining the scope of the claimed invention.

What is claimed is:

1. A method for providing delay change information for a first signal having a delay which from time to time experiences significant delay changes including the steps of:
   a) recognizing one or more event which will lead to a significant delay change in said first signal;
   b) determining delay change information including at least one of the amount and expected timing of the occurrence of said significant delay change of a);
   c) providing said delay change information in a manner that it may be utilized by other steps in the measurement, tracking, correction and/or maintenance of the delay of said first signal by devices including one or more of LSI, VLSI, FPGA, ASIC, RISC, DSP and IP Core electronic circuitry.

2. A method for providing delay change information for a delayed video type first signal which from time to time experiences significant delay changes, including the steps of:
   a) recognizing one or more event which will lead to a significant delay change in said video type signal;
   b) determining delay change information including at least one of the amount and timing of the occurrence of said significant delay change of a);
   c) providing said delay change information in a manner that it may be utilized to correct or maintain synchronization of said video type signal and another signal by devices including one or more of LSI, VLSI, FPGA, ASIC, RISC, DSP and IP Core electronic circuitry.

3. A method for correcting or maintaining synchronization between a first signal having a delay which from time to time experiences significant delay changes and a second, lesser delayed signal which is delayed by a tracking delay to provide said synchronization, including the steps of:
   a) recognizing one or more event which will lead to a significant delay change in said first signal;
   b) determining delay change information including at least one of the amount and timing of the occurrence of said significant delay change of a);
   c) providing said delay change information for use by said tracking delay.

4. A method for correcting or maintaining synchronization between a video like first signal having a delay which from time to time experiences significant delay changes and a second audio signal which may be delayed or undelayed and which is further delayed by a tracking delay to provide said synchronization, including the steps of:
   a) recognizing one or more event which will lead to a significant delay change in said video like signal;
   b) determining delay change information including at least one of the amount and timing of the occurrence of said significant delay change of a);
   c) providing said delay change information for use by said tracking delay.

5. A method as claimed in claim 1, 2, 3 or 4, wherein in step a) said event is a memory which delays said signal approaching an empty or full condition.

6. A method as claimed in claim 1, 2, 3 or 4, wherein in step a) said event occurs in said signal before it is stored in a memory causing said significant delay change.

7. A method as claimed in claim 1, 2, 3 or 4, wherein in step a) said event is a disruption of said signal before it is stored in a memory.

8. A method as claimed in claim 1, 2, 3 or 4, wherein in step a) said event is an operator command affecting the playback of said signal.

9. A method as claimed in claim 1, 2, 3 or 4, wherein in the timing of said significant delay change is determined in step b) and is responsive to a signal other than said first signal.

10. A method as claimed in claim 3 or 4, wherein in the timing of said significant delay change is included in step b) and is responsive to said second signal.

11. A method as claimed in claim 1, 2, 3 or 4, wherein in step b) said delay change information includes an indication of whether said delay will increase or decrease at said significant delay change.

12. A method as claimed in claim 1, 2, 3 or 4, wherein in step b) said delay change information includes the amount of said significant delay change which amount includes a sign indicating whether said delay increases or decreases.

13. A method for correcting or maintaining synchronization between a delayed video type signal which from time to time experiences significant delay changes, and an audio signal including the steps of:
   a) recognizing one or more event which will lead to a significant delay change in said video type signal;
   b) determining delay change information including at least one of the amount, direction and timing of the expected occurrence of said significant delay change of a);
   c) providing said delay change information to an audio delay which delays said audio signal;
   d) changing the step c) delay of said audio signal starting in advance of said expected occurrence of said significant delay change of b).

14. A method as claimed in claim 13 wherein in step d) the change of delay of said audio signal starts in advance of, and ends after, said expected occurrence.

15. A method as claimed in claim 13 wherein the timing of said expected occurrence is included in step b) and is responsive to said audio signal in delayed or undelayed form.

16. A method as claimed in claim 13, 14 or 15, wherein in step a) said event is a memory which delays said video type signal approaching an empty or full condition.

17. A method as claimed in claim 13, 14 or 15, wherein in step a) said event occurs in said video type signal before it is stored in a memory.

18. A method as claimed in claim 13, 14 or 15, wherein in step a) said event is a disruption of said video type signal before it is stored in a memory.

19. A method as claimed in claim 13, 14 or 15, wherein in step a) said event is an operator command affecting the playback of said video type signal from a memory.

20. A method as claimed in claim 13, 14 or 15, wherein in the timing of said significant delay change is included in step b) and is responsive to a signal other than said first signal.

21. A method as claimed in claim 13, 14 or 15, wherein in the timing of said significant delay change is included in step b) and is responsive to said audio signal of c) in delayed or undelayed form.

22. A method as claimed in claim 13, 14 or 15, wherein in step b) said delay change information includes an indication of whether said delay will increase or decrease at said significant delay change.

23. A method as claimed in claim 13, 14 or 15, wherein in step b) said delay change information includes the amount of said significant delay change which amount includes a sign indicating whether said delay increases or decreases.

24. A method as claimed in claim 1, 2, 3, 4, 13, 14 or 15 wherein in step b) said delay change information includes the amount of said significant delay change.

25. A method as claimed in claim 1, 2, 3, 4, 13, 14 or 15 wherein in step b) said delay change information includes the time at which said significant delay change is expected to take place.

26. A method as claimed in claim 1, 2, 3, 4, 13, 14 or 15 wherein in step b) said delay change information includes the duration over which said significant delay change takes place.

27. A method as claimed in claim 1, 2, 3, 4, 13, 14 or 15 wherein in step b) said delay change information includes the rate of delay change for said significant delay change.

28. A method as claimed in claim 1, 2, 3, 4, 13, 14 or 15 wherein in step b) said delay change information includes an indication of whether said significant delay change takes place on the delayed or undelayed version of said signal of a).

29. An apparatus for providing delay change information for a first signal passing through a delay circuit which signal from time to time experiences significant delay changes including in combination:
   a) a microprocessor circuit responsive to at least one of said first signal and said delay circuit to recognize one or more event which will lead to a significant delay change in said first signal;
   b) said microprocessor circuit responsive to said event and determining delay change information including at least one of the amount and expected timing of the occurrence of said significant delay change of a);
   c) said microprocessor circuit providing said delay change information in a manner that it may be utilized by other circuits in the measurement, tracking, correction and/or maintenance of the delay of said first signal.

30. An apparatus for providing delay change information for a video type first signal which is delayed in a delay circuit which video type signal from time to time experiences significant delay changes, including in combination:
   a) a digital circuit responsive to one of said video type signal and said delay circuit to recognize one or more event which will cause a significant delay change in said video type signal;
   b) a microprocessor circuit responsive to said digital circuit of a) to determine delay change information including at least one of the amount and timing of the occurrence of said significant delay change of a);
   c) said microprocessor circuit providing said delay change information in a manner that it may be utilized to correct or maintain synchronization of said video type signal and another signal.

31. An apparatus for correcting or maintaining synchronization between a first signal delayed in a delay circuit which signal from time to time experiences significant delay changes and a second, lesser delayed signal which is delayed by a tracking delay circuit to provide said synchronization, including in combination:
   a) a microprocessor circuit responsive to at least one of said first signal and said delay circuit and recognizing one or more event which will lead to a significant delay change in said first signal;
   b) said microprocessor circuit determining delay change information including at least one of the amount and timing of the occurrence of said significant delay change of a);
   c) said microprocessor circuit providing said delay change information for use by said tracking delay.

32. An apparatus for correcting or maintaining synchronization between a video like first signal which is delayed in a delay circuit and which from time to time experiences significant delay changes and an audio type second signal which is delayed by a tracking delay to provide said synchronization, including in combination:
   a) A first digital circuit responsive to at least one of said delay circuit and said video like signal to recognize one or more event which will lead to a significant delay change in said video like signal;
   b) A second digital circuit responsive to said first digital circuit of a) and determining delay change information including at least one of the amount and timing of the occurrence of said significant delay change of a);
   c) A third digital circuit responsive to said second digital circuit of b) and providing said delay change information for use by said tracking delay.

33. An apparatus as claimed in claim 29, 30, 31 or 32, wherein in a) said event is said delay circuit approaching an empty or full condition.

34. An apparatus as claimed in claim 29, 30, 31 or 32, wherein in a) said event occurs in said signal before it is stored in a memory causing said significant delay change.

35. An apparatus as claimed in claim 29, 30, 31 or 32, wherein in a) said event is a disruption of said signal before it is stored in a memory.

36. An apparatus as claimed in claim 29, 30, 31 or 32, wherein in a) said event is an operator command affecting the playback of said signal from a memory.

37. An apparatus as claimed in claim 29, 30, 31 or 32, wherein the timing of said significant delay change is determined in b) and is responsive to a signal other than said first signal.

38. An apparatus as claimed in claim 31 or 32, wherein in the timing of said significant delay change is included in b) and is responsive to said second signal.

39. An apparatus as claimed in claim 29, 30, 31 or 32, wherein in b) said delay change information includes an indication of whether said delay will increase or decrease at said significant delay change.

40. An apparatus as claimed in claim 29, 30, 31 or 32, wherein in b) said delay change information includes the amount of said significant delay change which amount includes a sign indicating whether said delay increases or decreases.

41. An apparatus for correcting or maintaining synchronization between a video type signal passed through a delay circuit which video signal from time to time experiences significant delay changes, and an audio signal including in combination:
   a) a first digital circuit responsive to one of said video type signal and said delay circuit and operating to recognize one or more event which will lead to a significant delay change in said video type signal;
   b) a second digital circuit responsive to said first digital circuit and operating to determine delay change information including at least one of the amount, direction and timing of the expected occurrence of said significant delay change of a);
   c) a third digital circuit responsive to said first digital circuit to provide said delay change information to an audio delay which delays said audio signal;
   d) said audio delay operating to change the delay of said audio signal starting in advance of said expected occurrence of said significant delay change of b).

42. An apparatus as claimed in claim 41 wherein in d) the change of delay of said audio signal starts in advance of, and ends after, said expected occurrence.

43. An apparatus as claimed in claim 41 wherein the timing of said expected occurrence is included in b) and is responsive to said audio signal in delayed or undelayed form.

44. An apparatus as claimed in claim 41, 42 or 43, wherein in a) said event is said delay circuit approaching an empty or full condition.

45. An apparatus as claimed in claim 41, 42 or 43, wherein in a) said event occurs in said video type signal before it is passed through said delay circuit.

46. An apparatus as claimed in claim 41, 42 or 43, wherein in a) said event is a disruption of said video type signal before it is passed through said delay circuit.

47. An apparatus as claimed in claim 41, 42 or 43, wherein in a) said event is an operator command affecting the playback of said video type signal from said delay circuit.

48. An apparatus as claimed in claim 41, 42 or 43, wherein in the timing of said significant delay change is included in b) and is responsive to a signal other than said video type signal.

49. An apparatus as claimed in claim 41, 42 or 43, wherein in the timing of said significant delay change is included in b) and is responsive to said audio signal of c) in delayed or undelayed form.

50. An apparatus as claimed in claim 41, 42 or 43, wherein in b) said delay change information includes an indication of whether said delay will increase or decrease at said significant delay change.

51. An apparatus as claimed in claim 41, 42 or 43, wherein in b) said delay change information includes the amount of said significant delay change which amount includes a sign indicating whether said delay increases or decreases.

52. An apparatus as claimed in claim 29, 30, 31, 41, 42 or 43, wherein in b) said delay change information includes the amount of said significant delay change.

53. An apparatus as claimed in claim 29, 30, 31, 41, 42 or 43, wherein in b) said delay change information includes the time at which said significant delay change is expected to take place.

54. An apparatus as claimed in claim 29, 30, 31, 41, 42 or 43, wherein in b) said delay change information includes the duration over which said significant delay change takes place.

55. An apparatus as claimed in claim 29, 30, 31, 41, 42 or 43, wherein in b) said delay change information includes the rate of delay change for said significant delay change.

56. An apparatus as claimed in claim 29, 30, 31, 41, 42 or 43, wherein in b) said delay change information includes an indication of whether said significant delay change takes place on the delayed or undelayed version of said signal of a).

57. A method for providing a television program having correct or improved synchronization between a video type signal of said program which video type signal from time to time experiences significant delay changes, and a related audio signal of said program, said method including the steps of:
   a) recognizing one or more event which will lead to a significant delay change in said video type signal;
   b) determining delay change information including at least one of the amount, direction and timing of the expected occurrence of said significant delay change of a);
   c) providing said delay change information to an audio delay which delays said audio signal;
   d) changing the step c) delay of said audio signal in response to said expected occurrence of said significant delay change of b).

58. A method as claimed in claim 57 wherein in step d) the change of delay of said audio signal starts in advance of, and ends after, said expected occurrence.

59. A method as claimed in claim 57 wherein the timing of said expected occurrence is included in step b) and is responsive to said audio signal in delayed or undelayed form.

60. A method as claimed in claim 57, 58 or 59, wherein in step a) said event is a memory which delays said video type signal approaching an empty or full condition.

61. A method as claimed in claim 57, 58 or 59, wherein in step a) said event occurs in said video type signal before it is stored in a memory.

62. A method as claimed in claim 57, 58 or 59, wherein in step a) said event is a disruption of said video type signal before it is stored in a memory.

63. A method as claimed in claim 57, 58 or 59, wherein in step a) said event is an operator command affecting the playback of said video type signal from a memory.

64. A method as claimed in claim 57, 58 or 59, wherein in the timing of said significant delay change is included in step b) and is responsive to a signal other than said first signal.

65. A method as claimed in claim 57, 58 or 59, wherein in the timing of said significant delay change is included in step b) and is responsive to said audio signal of c) in delayed or undelayed form.

66. A method as claimed in claim 57, 58 or 59, wherein in step b) said delay change information includes an indication of whether said delay will increase or decrease at said significant delay change.

67. A method as claimed in claim 57, 58 or 59, wherein in step b) said delay change information includes the amount of said significant delay change which amount includes a sign indicating whether said delay increases or decreases.

68. A method as claimed in claim 57, 58 or 59 wherein in step b) said delay change information includes the amount of said significant delay change.

69. A method as claimed in claim 57, 58 or 59 wherein in step b) said delay change information includes the time at which said significant delay change is expected to take place.

70. A method as claimed in claim 57, 58 or 59 wherein in step b) said delay change information includes the duration over which said significant delay change takes place.

71. A method as claimed in claim 57, 58 or 59 wherein in step b) said delay change information includes the rate of delay change for said significant delay change.

72. A method as claimed in claim 57, 58 or 59 wherein in step b) said delay change information includes an indication of whether said significant delay change takes place on the delayed or undelayed version of said signal of a).

73. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59.

74. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59.

75. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step a) said event is a memory which delays said video type signal approaching an empty or full condition.

76. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step a) said event occurs in said video type signal before it is stored in a memory.

77. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step a) said event is a disruption of said video type signal before it is stored in a memory.

78. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step a) said event is an operator command affecting the playback of said video type signal from a memory.

79. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in the timing of said significant delay change is included in step b) and is responsive to a signal other than said first signal.

80. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in the timing of said significant delay change is included in step b) and is responsive to said audio signal of c) in delayed or undelayed form.

81. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes an indication of whether said delay will increase or decrease at said significant delay change.

82. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes the amount of said significant delay change which amount includes a sign indicating whether said delay increases or decreases.

83. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes the amount of said significant delay change.

84. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes the time at which said significant delay change is expected to take place.

85. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes the duration over which said significant delay change takes place.

86. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes the rate of delay change for said significant delay change.

87. A device comprising electronic circuitry, said electronic circuitry including digital logic circuitry and memory circuitry said memory including one or more of RAM, ROM and PROM with said electronic circuitry, including said memory circuitry, being implemented within one or more of LSI, VLSI, FPGA, ASIC, RISC, DSP and IP Core in one or more of semiconductor, magnetic or optical forms, with said electronic circuitry further operating to perform the steps of claim 57, 58 or 59 wherein in step b) said delay change information includes an indication of whether said significant delay change takes place on the delayed or undelayed version of said signal of a).

88. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step a) said event is a memory which delays said video type signal approaching an empty or full condition.

89. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step a) said event occurs in said video type signal before it is stored in a memory.

90. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step a) said event is a disruption of said video type signal before it is stored in a memory.

91. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step a) said event is an operator command affecting the playback of said video type signal from a memory.

92. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in the timing of said significant delay change is included in step b) and is responsive to a signal other than said first signal.

93. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in the timing of said significant delay change is included in step b) and is responsive to said audio signal of c) in delayed or undelayed form.

94. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes an indication of whether said delay will increase or decrease at said significant delay change.

95. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes the amount of said significant delay change which amount includes a sign indicating whether said delay increases or decreases.

96. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes the amount of said significant delay change.

97. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes the time at which said significant delay change is expected to take place.

98. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes the duration over which said significant delay change takes place.

99. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes the rate of delay change for said significant delay change.

100. A device comprising electronic circuitry, said electronic circuitry including a microprocessor, support functions and memory, with said electronic circuitry being implemented in one or more of semiconductor, magnetic or optical forms, and said device further including said microprocessor operating under program code such that said microprocessor operates in a fashion as directed by said program code to perform the steps of claim 57, 58 or 59 wherein in step b) said delay change information includes an indication of whether said significant delay change takes place on the delayed or undelayed version of said signal of a).

* * * * *